United States Patent
Herschbein et al.

(10) Patent No.: US 8,111,903 B2
(45) Date of Patent: Feb. 7, 2012

(54) INLINE LOW-DAMAGE AUTOMATED FAILURE ANALYSIS

(75) Inventors: Steven B. Herschbein, Hopewell Junction, NY (US); Ronald C. Geiger, Jr., Lagrangeville, NY (US); George Y. Gu, Burlington, MA (US); Oleg Gluschenkov, Poughkeepsie, NY (US); Xu Ouyang, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 708 days.

(21) Appl. No.: 12/238,602

(22) Filed: Sep. 26, 2008

(65) Prior Publication Data

US 2010/0080446 A1   Apr. 1, 2010

(51) Int. Cl.
    *G06K 9/00* (2006.01)
(52) U.S. Cl. ........................................ 382/149
(58) Field of Classification Search .......... 382/141, 382/149, 117, 145, 155; 356/237.4, 237.5, 356/509
    See application file for complete search history.

(56) References Cited

U.S. PATENT DOCUMENTS

| | | | |
|---|---|---|---|
| 4,733,175 A * | 3/1988 | Levinson | 324/500 |
| 6,166,380 A * | 12/2000 | Kitagawa et al. | 250/307 |
| 6,579,732 B2 * | 6/2003 | Livengood et al. | 438/14 |
| 6,714,289 B2 * | 3/2004 | Haraguchi | 356/72 |
| 7,088,852 B1 * | 8/2006 | Bruce et al. | 382/145 |
| 7,203,877 B2 | 4/2007 | Yacobucci | |
| 7,230,239 B2 * | 6/2007 | Tanaka et al. | 250/306 |
| 7,248,355 B2 * | 7/2007 | Larson | 356/239.1 |
| 7,250,318 B1 | 7/2007 | Johnson et al. | |
| 7,301,146 B2 * | 11/2007 | Tomimatsu et al. | 250/310 |
| 7,385,195 B2 * | 6/2008 | Yamada et al. | 250/307 |
| 7,427,753 B2 * | 9/2008 | Pearl | 250/304 |
| 7,535,000 B2 * | 5/2009 | Phaneuf et al. | 250/309 |
| 7,786,436 B1 * | 8/2010 | Lundquist et al. | 250/309 |
| 7,897,918 B2 * | 3/2011 | Phaneuf et al. | 250/309 |
| 7,904,845 B2 * | 3/2011 | Fouquet et al. | 324/762.05 |
| 2008/0219546 A1 * | 9/2008 | Nguyen et al. | 382/149 |
| 2009/0034215 A1 * | 2/2009 | Wieglus et al. | 361/760 |

* cited by examiner

*Primary Examiner* — Gregory J Toatley
*Assistant Examiner* — Scott M Richey
(74) *Attorney, Agent, or Firm* — Ian D. MacKinnon; Howard M. Cohn

(57) ABSTRACT

A system and method for failure analysis of devices on a semiconductor wafer is disclosed. The present invention comprises the use of an inline focused ion beam milling tool to perform milling and image capturing of cross sections of a desired inspection point. The inspection points are located by identifying at least one fiducial that corresponds to an X-Y offset from the desired inspection point. The fiducials are recognized by a computer vision system. By automating the inspection process, the time required to perform the inspections is greatly reduced.

15 Claims, 6 Drawing Sheets

INLINE LOW-DAMAGE AUTOMATED FAILURE ANALYSIS

FIELD OF THE INVENTION

The present invention relates generally to semiconductor manufacturing. More specifically, the present invention relates to automated testing, inspection, and failure analysis of semiconductors during the manufacturing process.

BACKGROUND OF THE INVENTION

Engineers need to analyze defects and other failures during semiconductor fabrication to troubleshoot, adjust, and improve the fabrication processes. For example, defect analysis is useful in all aspects of semiconductor production including design verification diagnostics, production diagnostics, as well as other aspects of microcircuit research and development. As device geometries continue to shrink and new materials are introduced, the structural complexity of today's semiconductors grows exponentially. Many of the structures created are often interconnected with previous layers. Thus, the defects and structural causes of device failure are often hidden well below the surface.

Accordingly, defect analysis often requires cross-sectioning and viewing defects on a three-dimensional basis. With the growing use of copper conductor devices on semiconductor wafers, better systems capable of performing three dimensional defect analyses are more important than ever. Furthermore, as semiconductor device densities and wafer areas increase, the volume of product diagnostic data required to diagnose yield-limiting defects grows exponentially.

Electrical test data correlation to in-line process defects is called electronic test process limited yield (e-TPLY). The current e-TPLY practice involves removing a wafer from the manufacturing line. This wafer becomes a scrap wafer. The desired die within the wafer is then cut, delayered, and subject to top-down and cross-section inspections. This process is highly manual, and very slow. Typical turnaround time can be as high as five days. Furthermore, the entire wafer has to be scrapped. Since this wafer may contain many good die, scrapping the entire wafer may result in a waste of good chips.

Therefore, what is needed is an improved failure analysis system and method that addresses the aforementioned disadvantages of the current practice.

SUMMARY OF THE INVENTION

The present invention provides a method for failure analysis of devices on a semiconductor wafer, comprising the steps of: retrieving test data from an automated testing equipment tool; selecting one or more inspection points, based on failures indicated in the test data; routing the wafer to an inline focused ion beam milling tool; identifying an inspection point location by locating at least one fiducial, the fiducial corresponding to an X-Y offset from the inspection point, and the fiducial having a depth corresponding to the depth of the inspection point; milling at the inspection point location until the depth milled is greater than or equal to the depth of the fiducial; recording a cross-section image at the inspection point location; and performing analysis on the cross-section image to determine a failure cause.

The present invention further provides a method wherein the step of performing analysis on the cross-section image to determine a failure cause comprises the steps of: comparing the cross-section image to a plurality of images in a cross-section image database; and categorizing the cross-section image based on the closest match from the cross-section image database.

The present invention further provides a method wherein the step of selecting one or more inspection points comprises the steps of identifying a failed circuit within a device on the wafer from the test data retrieved from the automated testing equipment tool; generating an electrical failure pattern based on the test data retrieved from the automated testing equipment tool; comparing the electrical failure pattern to a plurality of failure signatures in a root cause database; and identifying one or more inspection points based on the closest match from the root cause database.

The present invention further provides a method wherein the step of recording a cross-section image at the inspection point location is performed with a scanning electron microscope.

The present invention further provides a method wherein the step of identifying an inspection point location by locating at least one fiducial comprises the step of recognizing the fiducial with a computer vision system.

The present invention further provides a method wherein the step of recognizing the fiducial with a computer vision system further comprises the step of identifying a fiducial having a shape selected from the group consisting of rectangle, triangle, and cross.

The present invention further provides a method wherein the step of identifying an inspection point location by locating at least one fiducial, further comprises the steps of: configuring the focused ion beam milling tool to etch at a first X-Y position on the wafer, the first X-Y position corresponding to the location of a fiducial at a desired layer; milling at the first X-Y position until the fiducial is recognized by a computer vision system associated with the inline focused ion beam milling tool; recording a depth value corresponding to the depth required to mill to reach the fiducial; and configuring the focused ion beam milling tool to etch at a second X-Y position on the wafer, the second position corresponding to the location of an inspection point.

The present invention also provides a method which further comprises the step of: configuring the inline focused ion beam milling tool to etch at a second X-Y position on the wafer, the second X-Y position corresponding to the location of a local fiducial at a desired layer, wherein the local fiducial is closer to the inspection point than the fiducial at the first X-Y position.

The present invention further provides a method wherein the step of identifying an inspection point location by locating at least one fiducial, further comprises the steps of: locating a first X-Y position on the wafer, the first X-Y position corresponding to the location of a global die corner marker; configuring the focused ion beam milling tool to etch at a second X-Y position on the wafer, the second X-Y position corresponding an X-Y offset from the location of the global die corner marker, and wherein the second position corresponds to a location proximal to an inspection point; and performing planar milling at the second X-Y position until the fiducial is recognized by a computer vision system.

The present invention further provides a method wherein the step of performing planar milling at the second X-Y position until the fiducial is recognized by a computer vision system further comprises the step of identifying a fiducial having a shape selected from the group consisting of rectangle, triangle, and cross.

The present invention also provides a method for evaluating the effectiveness of a final testing procedure of a semiconductor integrated circuit, comprising the steps of: damaging the integrated circuit at a known location in an intermediate layer; completing the fabrication of the damaged integrated circuit; performing a final testing procedure; and determining if the final testing procedure detected damage introduced at the known location.

The present invention further provides a method wherein the step of damaging the integrated circuit at a known location in an intermediate layer comprises the steps of: locating at least one damage point by locating at least one fiducial, the fiducial corresponding to an X-Y offset from the damage point, and the fiducial having a depth corresponding to the depth of the damage point; and milling at the damage point.

The present invention further provides a method wherein the step of damaging the integrated circuit at a known location in an intermediate layer comprises the steps of: locating a damage point by configuring the focused ion beam milling tool to etch at a first X-Y position on the wafer, the first position corresponding to the location of a fiducial at a desired layer; milling at the first X-Y position until the fiducial is recognized by a computer vision system associated with the focused ion beam milling tool; recording a depth value corresponding to the depth required to mill to reach the fiducial; configuring the focused ion beam milling tool to etch at a second X-Y position on the wafer, the second position corresponding to the location of a damage point; and milling at the damage point.

The present invention further provides a method wherein the step of damaging the integrated circuit at a known location in an intermediate layer comprises the steps of: locating a first X-Y position on the wafer, the first X-Y position corresponding to the location of a global die corner marker; configuring the focused ion beam milling tool to etch at a second X-Y position on the wafer, the second X-Y position corresponding an X-Y offset from the location of the global die corner marker, and wherein the second position corresponds to a location proximal to a damage point; performing planar milling at the second X-Y position until a fiducial is recognized by a computer vision system; and milling at the damage point.

The present invention also provides a system for performing failure analysis of devices on semiconductor wafer, comprising: an automated testing equipment tool; an inline focused ion beam milling tool; an imaging tool; a CAD database; a processor, wherein the processor is configured to communicate with the automated testing equipment tool, inline focused ion beam milling tool, and imaging tool, and wherein the processor is configured to retrieve data from the CAD database.

The present invention further provides a system wherein the CAD database contains data stored in one or more formats selected from the group consisting of ChipView, GL1, GDS2, KLARFF, and Knights.

The present invention further provides a system that comprises a cross-section image database; and wherein the processor is configured to retrieve data from the cross-section image database.

The present invention further provides a system wherein the cross-section image database comprises a plurality of good images and defective images.

The present invention further provides a system that comprises a root cause database; and wherein the processor is configured to retrieve data from the root cause database.

The present invention further provides a system wherein the inline focused ion beam milling tool is a dual beam focused ion beam milling tool that comprises a focused ion beam column, an electron column, and an imaging tool.

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting.

Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity. Block diagrams may not illustrate certain connections that are not critical to the implementation or operation of the present invention, for illustrative clarity.

Figure 1:
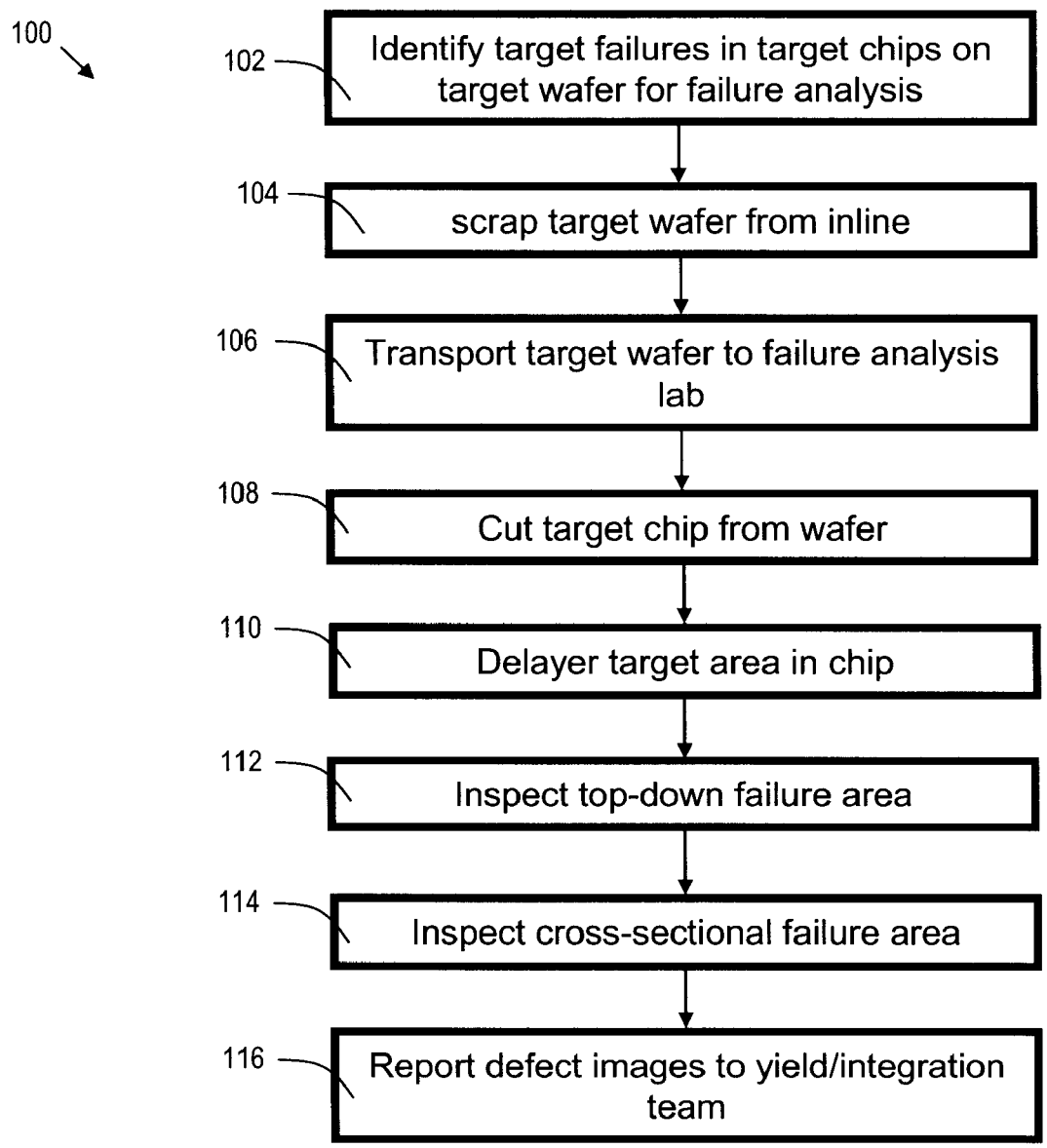

In the drawings accompanying the description that follows, often both reference numerals and legends (labels, text descriptions) may be used to identify elements. If legends are provided, they are intended merely as an aid to the reader, and should not in any way be interpreted as limiting.

FIG. 1 is a flowchart of a prior art method of failure analysis.

Figure 2A:
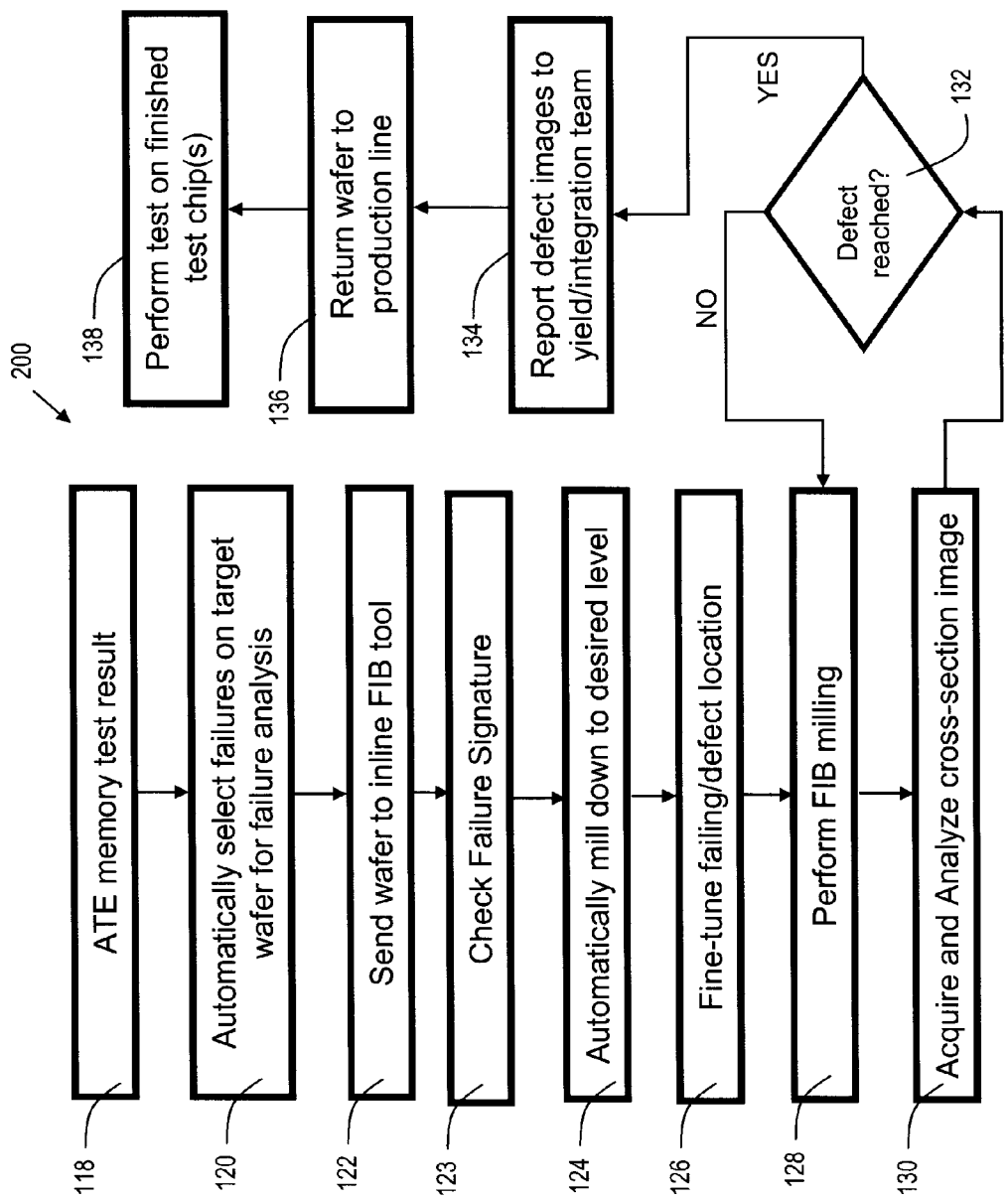
Figure 2B:
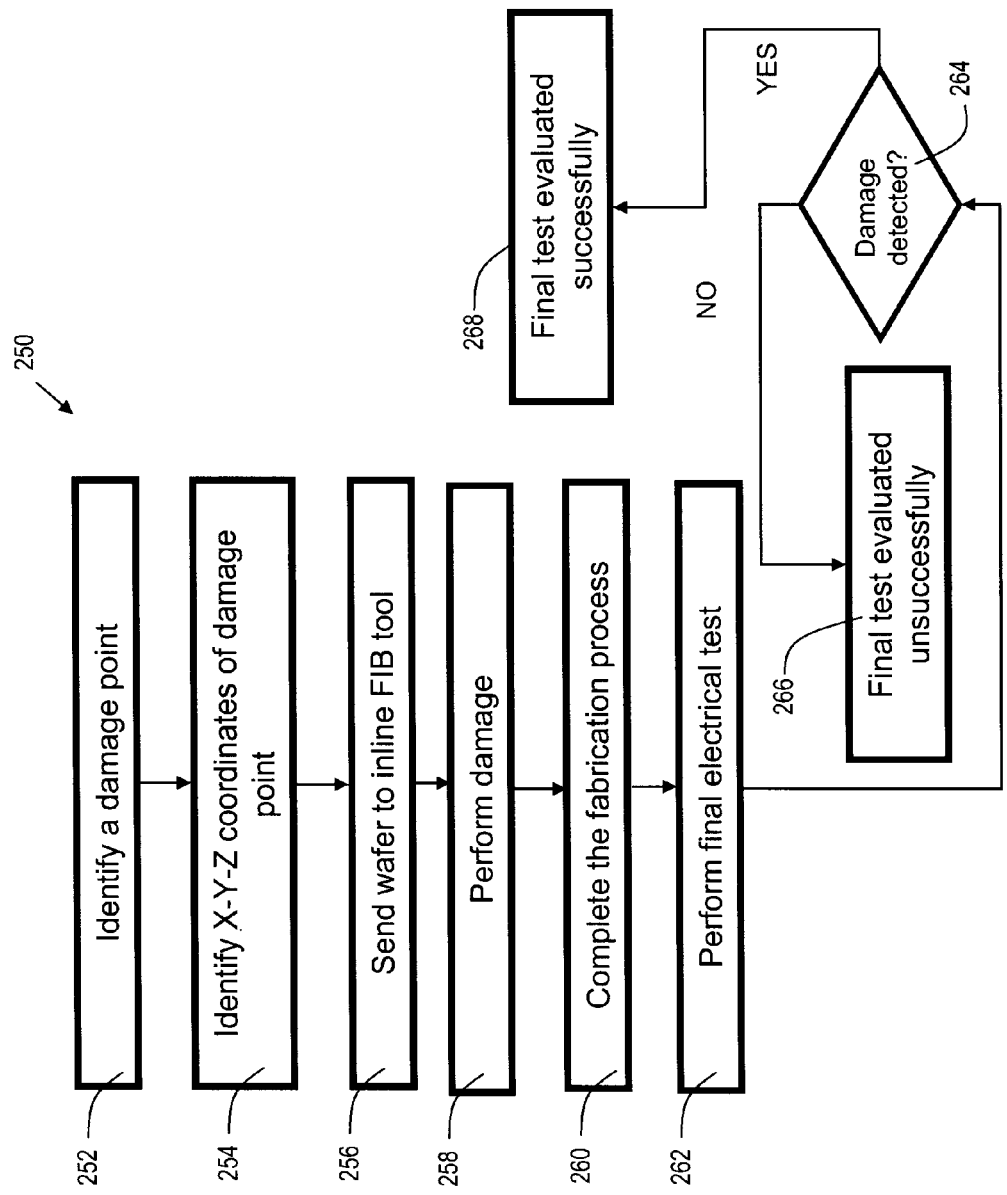

FIGS. 2A and 2B show flowcharts of methods of the present invention.

Figure 3:
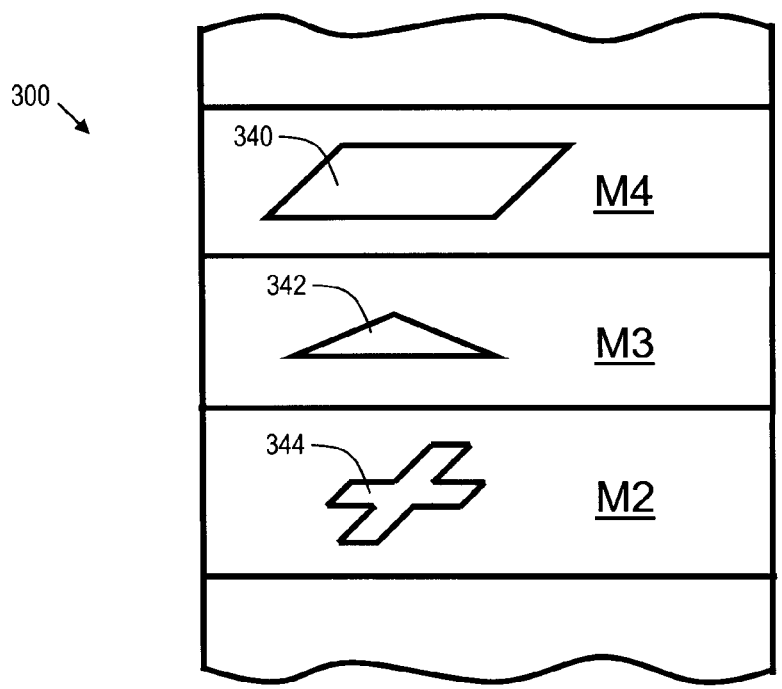

FIG. 3 is a cross-sectional view of a portion of an integrated circuit, indicating fiducial markings.

Figure 4:
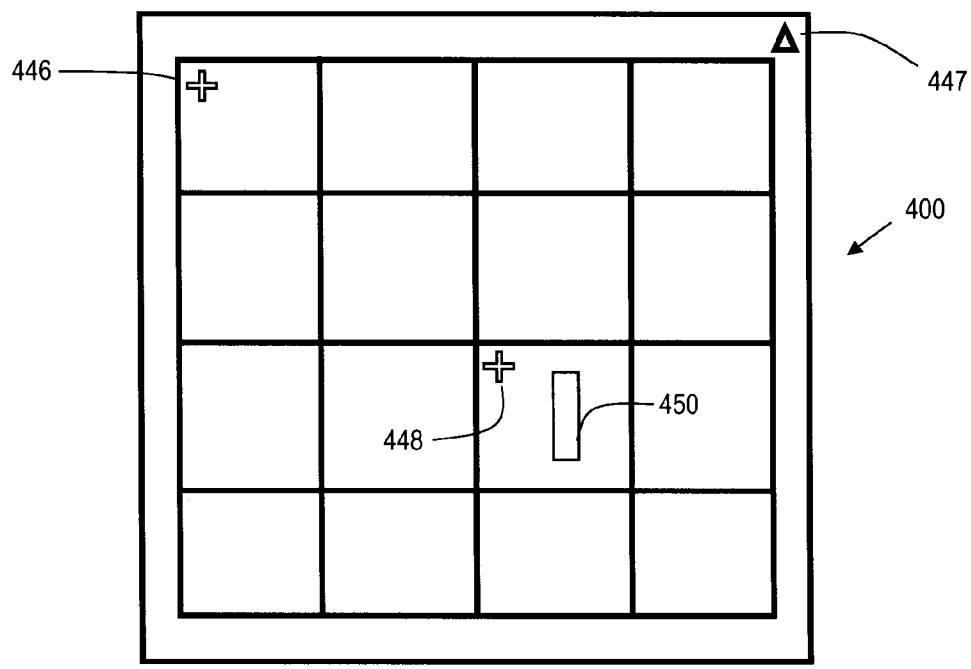

FIG. 4 is a top-down view of a portion of an integrated circuit, indicating fiducial markings.

Figure 5A:
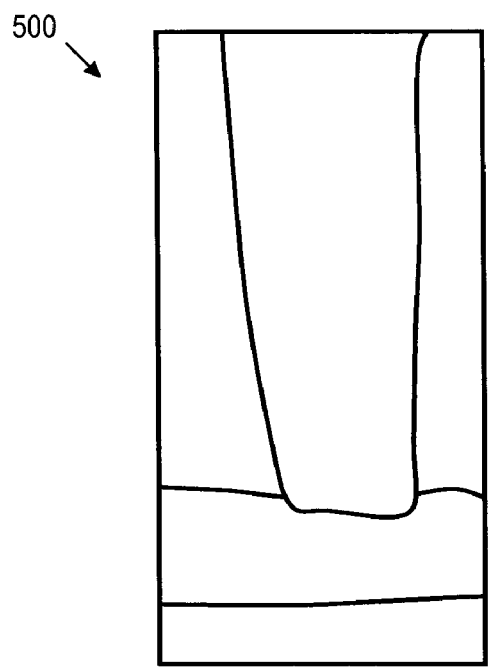
Figure 5B:
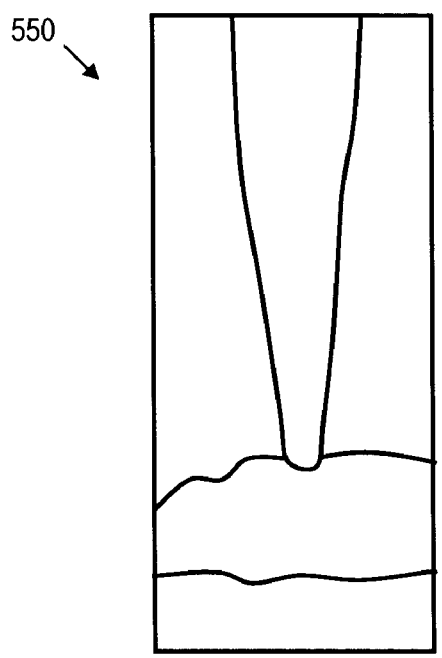

FIG. 5A and FIG. 5B illustrate cross-sections of inspection points.

Figure 6:
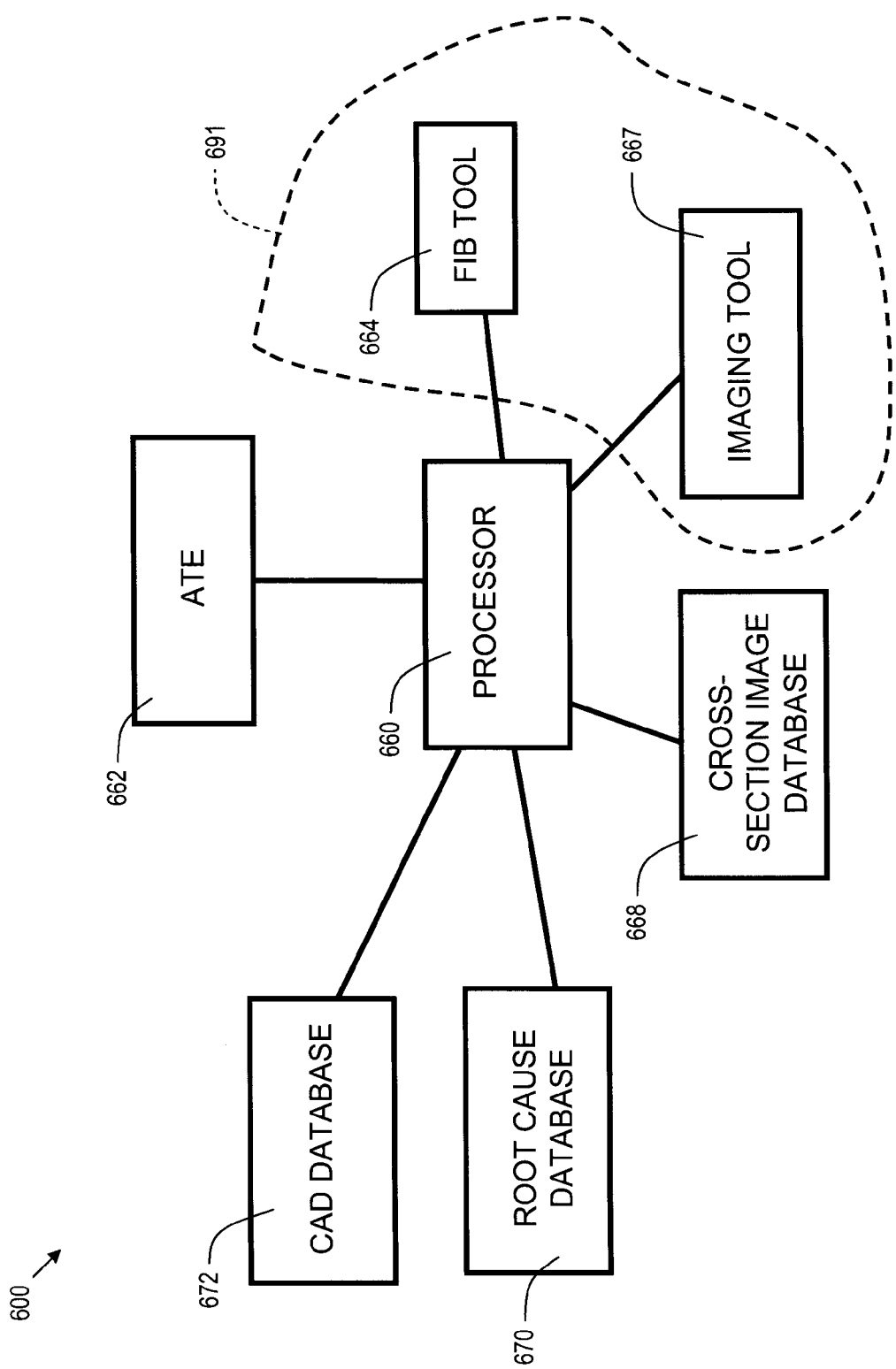

FIG. 6 is a system in accordance with the present invention.

DETAILED DESCRIPTION

FIG. 1 is a flowchart 100 of a prior art method of failure analysis. The prior art method will be briefly reviewed here to provide context for discussion of the present invention. In process step 102, target failures are identified in one or more chips (dies) on the target wafer (the wafer to be tested). In process step 104, the target wafer is removed from inline processing, and is no longer part of the production line. In process step 106, the target wafer is transported to a failure analysis lab. This step adds considerably to the time required to perform the testing. In process step 108, the target chip (die) is removed from the wafer, again adding to the overall time required to obtain failure analysis data. In process step 110, the target area (area where the suspected failure has occurred) is delayered to the desired level, via a milling tool. In process step 112, the top-down failure area is inspected. This step can be highly manual, and hence time consuming and error prone, as it involves identifying a precise location, such as a cell in an SRAM device. In process step 114, a cross-sectional area is examined, via a FIB (Focused Ion Beam) tool, and imaging means, such as a SEM (Scanning Electron Microscope). In process step 116, the results are manually compiled into a report. The report is typically provided to a yield/integration team at a semiconductor manufacturing facility for further study. As stated previously, the entire process may require up to five days due to the number of different teams involved, and the number of manual steps. Furthermore, since an entire wafer is scrapped, many good chips are wasted during this process.

FIG. 2 is a flowchart 200 of a method of failure analysis of the present invention. In process step 118, results from an ATE (Automated Test Equipment) memory test result (also referred to as a "bitmap") are received. The bitmap indicates failures on the target chip (die) within the target wafer. In process step 120, one or more failures are automatically selected for inspection and analysis. In process step 122, the target wafer is automatically routed (via standard wafer handling mechanisms) to an inline FIB tool. The inline FIB tool is capable of both planar milling as well as cross-sectioning. That is, the inline FIB tool is capable of milling the surface away evenly over a defined area or milling a "stair-step" pattern for imaging the sidewall as a cross-section.

In process step 123, which is optional, an evaluation of the electrical failure pattern is performed by comparing it with electrical failure signatures stored in a root cause database. For example, supposing a memory cell comprised of six transistors, then depending on the type of electrical failure, the root cause database can provide likely candidates for which transistor(s) has failed. The CAD data indicates what level the individual features of that transistor are on, and hence provides the information on where to perform the cross-section inspection.

In process step 124, the inline FIB (milling) tool mills down to the desired layer on the chip. This is performed by importing XYZ coordinate data (referred to as "XYZ data") from a known source (such as a KLARFF aided by layout CAD), and milling down into the chip until a landmark pattern (referred to as a "fiducial") is identified. Since the likely failure has already been identified in process step 123, prior to the milling, it increases the likelihood of selecting fiducials that are physically close to the defect requiring inspection, thereby increasing targeting accuracy. In practice, it is contemplated that the fiducials will be regularly distributed throughout the chip, so that a fiducial is never more than a predetermined distance (e.g. 1,200 nanometers) away from a potential fail site. A fiducial that is proximal to the inspection point is referred to as a "local" fiducial. Note that when used in a planar milling mode, the inline FIB tool is configured to mill an area that is sufficiently large to encompass the area around the fiducial. Hence, sufficient material is cleared away such that the fiducial can be recognized by a computer vision system. When used in a cross-section mode, the inline FIB tool is configured to perform a "FIB mill" that etches a very small area to reveal the cross-section of a particular feature.

Once the fiducial has been recognized, the vertical distance Z required to mill to reach the desired layer is identified. In process step 126, the X-Y location of the FIB tool is fine-tuned by using additional "local" fiducial markers nearer to the desired inspection area.

In process steps 128-132, FIB milling and cross-section image acquisition and analysis (e.g. via a scanning electron microscope (SEM)) are repeated until, at process step 132, it is determined that the defect has been reached (by milling to the proper depth). In a preferred embodiment, both the milling and imaging are performed on an inline FIB tool that is a dual beam FIB, containing the focused ion beam column (FIB) and the electron (SEM) column, slice or topside mill, and high resolution imager.

In process step 134, a report is automatically generated and provided to the desired stakeholders (e.g. yield team, production managers, etc. . . . ). In process step 136, the target wafer is returned to the production line. Therefore, unlike the prior art method, other chips on the die can complete the fabrication process and become salable product, thereby reducing waste.

Optionally, at process step 138, the target chip (the chip with the known failures) is removed from the wafer, and additional testing is performed. The rest of the die on the wafer remain untouched and can be removed and sold. In process step 138, the present invention exploits the fact that there are known errors (caused by FIB milling) in an intermediate layer (e.g. M3) of the chip. Each known error is referred to as a "damage point." By completing fabrication of these chips that have one or more damage points, the final testing procedures (i.e. tests performed on a completed chip) can be evaluated in terms of their ability to detect a failed circuit within a chip, thereby providing increased data for yield analysis. Completion of the fabrication of these chips may comprise performing a deposition followed by a chemical mechanical polish (CMP) at a subsequent step in the manufacturing process, ensuring that the milled area where damage occurred is filled and planarized. Another benefit the present invention provides is the opportunity to study how errors at an intermediate layer manifest themselves in a completed device.

FIG. 2B is a flowchart 250 illustrating process steps for a method for evaluating the effectiveness of a final testing procedure of a semiconductor integrated circuit. In process step 252, a damage point (or possibly multiple damage points) is identified. In process step 254, the X, Y, and Z coordinates of a damage point are identified. This allows the chip to be damaged in a controlled manner in a known location. In process step 256, the wafer is sent to an inline FIB tool, which will be used to perform the damage. In process step 258, the damage is performed by the inline FIB tool. This is performed by using the fiducials or global die markers as references to locate the desired damage point, and then performing an etch to perform isolated damage to a specific location. For example, the damage may comprise creating an open in an electrical connection within an intermediate layer of the chip.

In process step 260, the fabrication process is completed by a combination of subsequent deposition layers and chemical mechanical polishing (CMP) to fill and planarize the damaged area. In process step 262, a final electrical test is performed on the completed device. In process step 264 the results of the testing performed in process step 262 are evaluated to determine if the final testing procedure detected damage introduced at the known location. If the damage is detected, the final test is considered as successful in process step 268, since it properly detected the intentionally introduced damage that occurred in process step 258. If the damage is not detected, the final test may be considered as unsuccessful in process step 266, since it did not detect the intentionally introduced damage that occurred in process step 258. However, in some cases, the fact that the damage is not detected may also be interpreted as a successful test of the chip itself, in cases where it is intended that built-in redundancy of the chip will simply disconnect the functional circuit block that was damaged, and substitute a new, working functional circuit block in its place. In this way, the present invention can also be used to perform an evaluation of fault-tolerance within a semiconductor integrated circuit.

FIG. 3 is a cross-sectional view of a portion of an integrated circuit 300, indicating fiducial markings. Three layers are shown, indicated as M2, M3, and M4. Each layer has a fiducial having a unique shape. In the example shown, layer M4 has rectangle fiducial 340, layer M3 has triangle fiducial 342, and layer M2 has cross fiducial 344. The fiducial shapes are chosen to be easily recognizable by computer vision systems that are prevalent in the industry. Note that the present invention is not limited to the shapes illustrated in FIG. 3. Other fiducial shapes (for example, a diamond or circle, to name a few) may be used without departing from the scope of the present invention. In this way, the depth required to reach a desired level can be ascertained by automatically recognizing the desired fiducial shape. This depth value is then recorded, and can be used as an "etch stop" limit when performing future etch steps. For example, to reach layer M3, the integrated circuit 300 is milled until the triangle fiducial 342 is recognized by the computer vision system integrated with the FIB tool. The amount of time required to reach fiducial M3 is an etch time that corresponds to a depth, given a known etch rate. Hence, the depth can be derived from the etch time required to reach the fiducial at a given etch rate.

FIG. 4 is a top-down view of a portion of an integrated circuit 400, indicating fiducial markings. Fiducial 446 indicates a global fiducial that is used for X-Y location assessment and depth assessment (to identify the layer). Fiducial 448 is a local fiducial, closer to the desired inspection area 450. Note that in an application where intentional damage is being performed on a die, reference 450 may be referred to as a "damage point." In one embodiment, global fiducial 446 is first located, then local fiducial 448 is then located, in order to obtain more precision and accuracy in identifying the desired inspection area 450. Fiducials 446 and 448 are applied to the chip via industry-standard lithographic methods. The fiducials do not serve any circuit function, but rather are used for facilitating accurate recognition by a computer vision system.

Note that as an alternative to the two step process described above, the milling process steps can be combined when possible. By utilizing global die corner marker 447 for alignment, the FIB tool can be oriented to the general area of the desired memory block. Since global die corner marker 447 is visible at the surface, no etching is required to identify it, hence an etch step is eliminated, thereby saving time.

Once the FIB tool is oriented to the general area of the desired memory block, planar milling in an approximate search area will uncover the local fiducials that will identify the layer (depth), as well as allow fine tuning of the X-Y location. In this way, milling down to one set of local fiducials would provide both X-Y and Z information required for the inspection.

When properly equipped, Focused Ion Beam (FIB) tools are capable of performing highly accurate navigation. The basic procedure involves establishing a 1:1 relationship between the CAD file and the wafer structures. The CAD file can be present in a Knights format, as ChipView, GL1, GDS2, KLARFF coordinates, to name a few. Once this 'lock' is performed, 'pointing' to a particular feature on the CAD screen will configure the FIB tool to move the stage and/or beam to place this exact die/wafer physical feature directly under the ion beam. Generally speaking, the highest accuracy will be obtained within a relatively narrow movement area due to factors that can not be modeled by the currently available prediction algorithms, such as wafer bowing or other pattern distortions. Pincushion bowing can have a severe impact on drive accuracy, and is a common issue on module mounted individual die.

CAD/Stage lock is a basic tenant of the blind navigation chip edit process, currently used with a high degree of success in laboratory work. These purpose-built FIB tools employ a closed loop laser tracked stage with motor correction on the mechanical drives, and image based correction to adjust beam steering. The former adjusts for initial drive placement and subsequent mechanical drift, the latter for surface charge accumulation induced beam drift. The number of motor steps required to drive the stage to a particular X/Y coordinate is adjusted thru a translation algorithm that accounts for rotation, skew and run-out errors between the layout and the as printed pattern on silicon.

FIG. 5A and FIG. 5B illustrate cross-sections of inspection points. Cross-section image 500 of FIG. 5A represents a "good" image, and cross-section image 550 of FIG. 5B represents a "defect" image. A collection of cross-section images (comprising both good and defect images) are stored in an image database. When cross-section images of the chip undergoing test are collected, they are then compared against database images. If a cross-section image closely matches one in the image database, it is then automatically categorized (e.g. as good, or failure, or a specific failure type) accordingly. If more than one cross-section image are close matches, then the closest match is used for classification purposes.

FIG. 6 is a system 600 in accordance with the present invention. Processor 660 is preferably implemented via one or more networked computers configured to communicate with, and control, various other elements of the system 600. Processor 660 executes software on one or more microprocessors to provide a user interface for control and monitoring of the analysis process. ATE 662 (Automated Test Equipment) provides a bitmap of testing results for a particular device under test, such as an SRAM (static random access memory) device, to the processor 660. Processor 660 compares the information provided by ATE 662 to information stored in Root Cause Database 670. For example, a particular failure within an SRAM cell may signify particular interconnects that warrant inspection.

Processor 660 is configured to control FIB tool 664 which performs the "milling" that etches down to the desired layer (e.g. M3). Processor 660 retrieves XY coordinate information for the chip being inspected from CAD data base 672. FIB tool 664 is directed by processor 660 to an X-Y coordinate corresponding to a fiducial at the desired layer where the inspection is to be performed. FIB tool 664 is equipped with a computer vision system that performs pattern recognition on the fiducial image (e.g. 446 of FIG. 4). The depth of the layer is then known.

The FIB tool 664 is then moved to the desired inspection area (e.g. 450 of FIG. 4), and the FIB tool "mills" (etches in a controlled manner) the chip until the desired level is reached. Imaging tool 667 then is used to retrieve a cross-section image of an inspection point (e.g. 500 in FIG. 5A). In one embodiment, FIB tool 664, and imaging tool 667 are integrated into a dual function device 691, which is capable of both milling, and imaging. The cross section image is compared with images in cross-section image database 668, and if a similar image exists in the database 668, the inspection point is categorized accordingly (e.g. as good, defective, etc.).

The present invention provides an improved method and system for automated failure analysis. By integrating automated test data, CAD data, FIB tool control, imaging tool control, and various analysis databases, testing efficiency is greatly improved. Furthermore, a new source of testing data is achieved, due to the completion of chips with known failures. By testing these chips as finished products, testing and validation procedures can be evaluated in new ways.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A method for failure analysis of devices on a semiconductor wafer, comprising the steps of:
   retrieving test data from an automated testing equipment tool;
   selecting one or more inspection points, based on failures indicated in the test data;
   routing the wafer to an inline focused ion beam milling tool;
   identifying an inspection point location by locating at least one fiducial, the fiducial corresponding to an X-Y offset from the inspection point, and the fiducial having a depth corresponding to the depth of the inspection point;
   milling at the inspection point location until the depth milled is greater than or equal to the depth of the fiducial;
   recording a cross-section image at the inspection point location; and
   performing analysis on the cross-section image to determine a failure cause.

2. The method of claim 1, wherein the step of performing analysis on the cross-section image to determine a failure cause comprises the steps of:
   comparing the cross-section image to a plurality of images in a cross-section image database; and
   categorizing the cross-section image based on the closest match from the cross-section image database.

3. The method of claim 1, wherein the step of selecting one or more inspection points comprises the steps of:
   Identifying a failed circuit within a device on the wafer from the test data retrieved from the automated testing equipment tool;
   generating an electrical failure pattern based on the test data retrieved from the automated testing equipment tool;
   comparing the electrical failure pattern to a plurality of failure signatures in a root cause database; and
   identifying one or more inspection points based on the closest match from the root cause database.

4. The method of claim 1, wherein the step of recording a cross-section image at the inspection point location is performed with a scanning electron microscope.

5. The method of claim 1, wherein the step of identifying an inspection point location by locating at least one fiducial comprises the step of recognizing the fiducial with a computer vision system.

6. The method of claim 5, wherein the step of recognizing the fiducial with a computer vision system further comprises the step of identifying a fiducial having a shape selected from the group consisting of rectangle, triangle, and cross.

7. The method of claim 1, wherein the step of identifying an inspection point location by locating at least one fiducial, further comprises the steps of:
   configuring the focused ion beam milling tool to etch at a first X-Y position on the wafer, the first X-Y position corresponding to the location of a fiducial at a desired layer;
   milling at the first X-Y position until the fiducial is recognized by a computer vision system associated with the inline focused ion beam milling tool;
   recording a depth value corresponding to the depth required to mill to reach the fiducial; and
   configuring the focused ion beam milling tool to etch at a second X-Y position on the wafer, the second position corresponding to the location of an inspection point.

8. The method of claim 7, further comprising the step of:
   configuring the inline focused ion beam milling tool to etch at a second X-Y position on the wafer, the second X-Y position corresponding to the location of a local fiducial at a desired layer, wherein the local fiducial is closer to the inspection point than the fiducial at the first X-Y position.

9. The method of claim 1, wherein the step of identifying an inspection point location by locating at least one fiducial, further comprises the steps of:
   locating a first X-Y position on the wafer, the first X-Y position corresponding to the location of a global die corner marker;
   configuring the focused ion beam milling tool to etch at a second X-Y position on the wafer, the second X-Y position corresponding an X-Y offset from the location of the global die corner marker, and wherein the second position corresponds to a location proximal to an inspection point; and
   performing planar milling at the second X-Y position until the fiducial is recognized by a computer vision system.

10. The method of claim 9, wherein the step of performing planar milling at the second X-Y position until the fiducial is recognized by a computer vision system further comprises the step of identifying a fiducial having a shape selected from the group consisting of rectangle, triangle, and cross.

11. A method for evaluating the effectiveness of a final testing procedure of a semiconductor integrated circuit, comprising the steps of:
    damaging the integrated circuit at a known location in an intermediate layer;
    completing the fabrication of the damaged integrated circuit; and
    performing a final testing procedure; and
    determining if the final testing procedure detected damage introduced at the known location.

12. The method of claim 11, wherein the step of damaging the integrated circuit at a known location in an intermediate layer comprises the steps of:
    locating at least one damage point by locating at least one fiducial, the fiducial corresponding to an X-Y offset from the damage point, and the fiducial having a depth corresponding to the depth of the damage point; and
    milling at the damage point.

13. The method of claim 11, wherein the step of damaging the integrated circuit at a known location in an intermediate layer comprises the steps of:
    locating a damage point by configuring the focused ion beam milling tool to etch at a first X-Y position on the wafer, the first position corresponding to the location of a fiducial at a desired layer;
    milling at the first X-Y position until the fiducial is recognized by a computer vision system associated with the focused ion beam milling tool;
    recording a depth value corresponding to the depth required to mill to reach the fiducial; and
    configuring the focused ion beam milling tool to etch at a second X-Y position on the wafer, the second position corresponding to the location of a damage point; and
    milling at the damage point.

14. The method of claim 11, wherein the step of damaging the integrated circuit at a known location in an intermediate layer comprises the steps of:
    locating a first X-Y position on the wafer, the first X-Y position corresponding to the location of a global die corner marker;
    configuring the focused ion beam milling tool to etch at a second X-Y position on the wafer, the second X-Y position corresponding an X-Y offset from the location of the global die corner marker, and wherein the second position corresponds to a location proximal to a damage point; and performing planar milling at the second X-Y position until a fiducial is recognized by a computer vision system; and milling at the damage point.

15. A system for failure analysis of devices on a semiconductor wafer, comprising:

an automated testing equipment tool for retrieving test data;

a processor for selecting one or more inspection points, based on failures indicated in the test data;

an inline focused ion beam milling tool for routing the wafer;

an imaging tool for identifying an inspection point location by locating at least one fiducial, the fiducial corresponding to an X-Y offset from the inspection point, and the fiducial having a depth corresponding to the depth of the inspection point;

whereby the milling tool mills at the inspection point location until the depth milled is greater than or equal to the depth of the fiducial.

* * * * *